United States Patent
Forrester et al.

(10) Patent No.: US 8,965,817 B1
(45) Date of Patent: Feb. 24, 2015

(54) SYSTEM AND METHOD FOR ACTIVE KNOWLEDGE MANAGEMENT

(75) Inventors: Dean Forrester, Houston, TX (US); James Wesley Jones, Naperville, IL (US); William Ronald Albert Keleher, New Orleans, LA (US); Carol Wright, Katy, TX (US)

(73) Assignee: Wipro Limited, Bangalore (IN)

( * ) Notice: Subject to any disclaimer, the term of this patent is extended or adjusted under 35 U.S.C. 154(b) by 828 days.

(21) Appl. No.: 12/889,639

(22) Filed: Sep. 24, 2010

(51) Int. Cl.
G06F 15/18 (2006.01)

(52) U.S. Cl.
USPC .............................................................. 706/14

(58) Field of Classification Search
USPC .............................................................. 706/14
See application file for complete search history.

(56) References Cited

U.S. PATENT DOCUMENTS

| | | | |
|---|---|---|---|
| 7,856,498 B2 * | 12/2010 | Hughes et al. | 709/224 |
| 7,894,721 B2 * | 2/2011 | Roberts et al. | 398/38 |
| 8,155,908 B2 * | 4/2012 | Nasle et al. | 702/85 |
| 2007/0222576 A1 * | 9/2007 | Miller et al. | 340/506 |
| 2008/0313121 A1 * | 12/2008 | Yan | 706/47 |
| 2009/0254572 A1 * | 10/2009 | Redlich et al. | 707/10 |
| 2009/0287628 A1 * | 11/2009 | Indeck et al. | 706/47 |
| 2011/0254680 A1 * | 10/2011 | Perkinson et al. | 340/506 |
| 2012/0166373 A1 * | 6/2012 | Sweeney et al. | 706/14 |

* cited by examiner

*Primary Examiner* — Wilbert L Starks
*Assistant Examiner* — Ababacar Seck
(74) *Attorney, Agent, or Firm* — LeClairRyan, a Professional Corporation

(57) ABSTRACT

Systems and methods are described herein for actively managing the knowledge of a group of people, such as an organization's employees. The systems and methods are implemented in one or more software modules that receive a current alarm event and identify historical information associated with a similar previous alarm event. The historical information associated with a similar previous alarm event can be presented to a user to assist the user in resolving the current alarm event. The software modules can collect new information associated with resolving the current alarm event and store the new information in a manner so that it can be identified easily in the future.

27 Claims, 7 Drawing Sheets

SYSTEM AND METHOD FOR ACTIVE KNOWLEDGE MANAGEMENT

BACKGROUND OF THE INVENTION

1. Field of the Invention

The present invention relates generally to the field of knowledge management and more particularly to techniques for capturing and managing the knowledge of employees and other people.

2. Description of the Related Art

Knowledge management systems are systems that collect and manage the knowledge of a group of people, such as the employees of an organization. Knowledge management systems are often implemented using software and computing devices. For example, conventional knowledge management tools and systems include wikis, blogs, filing systems, and document management systems.

Knowledge management systems are critical to maintaining the knowledge of an organization while its employees change over time. An effective knowledge management system will retain and organize the knowledge of an organization so that as existing employees leave the organization and new employees join the organization, the new employees will be able to locate and use the knowledge of the organization and that knowledge will not be lost with the departure of existing employees.

Conventional knowledge management tools and systems are limited in that they can be characterized as passive. In other words, conventional knowledge management tools and systems are dependent on users making a concerted effort to enter information properly so that later users can find relevant information. Users often use conventional knowledge management tools and systems inconsistently so that the organization's knowledge is not captured adequately and is not organized in a manner that makes the information easily accessible in the future.

SUMMARY OF THE INVENTION

Summary of the Problem

There is a need for a method and system that actively manages the knowledge of an organization. In other words, a need exists for an improved method and system for gathering and organizing an organization's knowledge that is less dependent on the user's willingness to use the method and system.

Summary of the Solution

The embodiments of the present invention facilitate the active gathering and management of the knowledge of an organization. The embodiments of the present invention provide a method and system for identifying a current alarm event and identifying information associated with a previous alarm event. The information associated with the previous alarm event can be used to resolve the current alarm event. An alarm event can be any indication of an abnormal operating condition.

In a first exemplary embodiment, a system for actively managing the knowledge of an organization is described. The exemplary system comprises an active knowledge management software module that can be installed on a computing device, such as a server computer. The active knowledge management module can receive alarm events from either an alarm system module or a predictive analytics module. The alarm system module and the predictive analytics module can identify alarm events from real time data collected by monitoring devices. The active knowledge management module can receive an alarm selection from a user and display default data associated with the selected alarm. The active knowledge management module can comprise a relevance module that calculates a relevance value for historical resolutions with respect to the selected alarm. The active knowledge management module can display a relevant historical resolution to assist a user in resolving the current alarm. The active knowledge management module collects data from the user about the resolution of the current alarm and can store the data in a historical resolutions data store for future use.

In a second exemplary embodiment, a computer-implemented method for actively managing the knowledge of an organization is described. The exemplary method comprises an active knowledge management software module receiving alarm events from either an alarm system module or a predictive analytics module. The alarm system module and the predictive analytics module can identify alarm events from real time data collected by monitoring devices. The active knowledge management module can receive an alarm selection from a user and display default data associated with the selected alarm. The active knowledge management module can comprise a relevance module that calculates a relevance value for historical resolutions with respect to the selected alarm. The active knowledge management module can display a relevant historical resolution to assist a user in resolving the current alarm. The active knowledge management module collects data from the user about the resolution of the current alarm and can store the data in a historical resolutions data store for future use.

In a third exemplary embodiment, a computer-readable storage medium comprising instructions for actively managing the knowledge of an organization is described. The instructions of the computer-readable storage medium can control the operation of an active knowledge management software module. The instructions can comprise the active knowledge management software module receiving alarm events from either an alarm system module or a predictive analytics module. The alarm system module and the predictive analytics module can identify alarm events from real time data collected by monitoring devices. The instructions can further comprise the active knowledge management module receiving an alarm selection from a user and displaying default data associated with the selected alarm. The instructions can further comprise a relevance module of the active knowledge management module calculating a relevance value for historical resolutions with respect to the selected alarm. The instructions can direct the active knowledge management module to display a relevant historical resolution to assist a user in resolving the current alarm. Finally, the instructions can direct the active knowledge management module to collect data from the user about the resolution of the current alarm and to store the data in a historical resolutions data store for future use.

These and other embodiments are described in the detailed description that follows and the associated drawings.

BRIEF DESCRIPTION OF THE FIGURES

The preferred embodiments of the present invention are illustrated by way of example and are not limited to the following figures.

DETAILED DESCRIPTION OF THE EXEMPLARY EMBODIMENTS

The invention is directed to systems and methods using software modules to actively manage knowledge for an organization. Although the exemplary embodiments will be generally described in the context of software modules running in a distributed computing environment, those skilled in the art will recognize that the present invention also can be implemented in conjunction with other program modules in a variety of other types of distributed or stand-alone computing environments. For example, in different distributed computing environments, program modules may be physically located in different local and remote memory storage devices. Execution of the program modules may occur locally in a stand-alone manner or remotely in a client/server manner. Examples of distributed computing environments include local area networks of an office, enterprise-wide computer networks, and the global Internet.

The detailed description that follows is represented largely in terms of processes and symbolic representations of operations in a computing environment by conventional computer components, which can include database servers, application servers, mail servers, routers, security devices, firewalls, clients, workstations, memory storage devices, display devices and input devices. Each of these conventional distributed computing components is accessible via a communications network, such as a wide area network or local area network.

The invention comprises computer programs that embody the functions described herein and that are illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an exemplary embodiment based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

Figure 1:
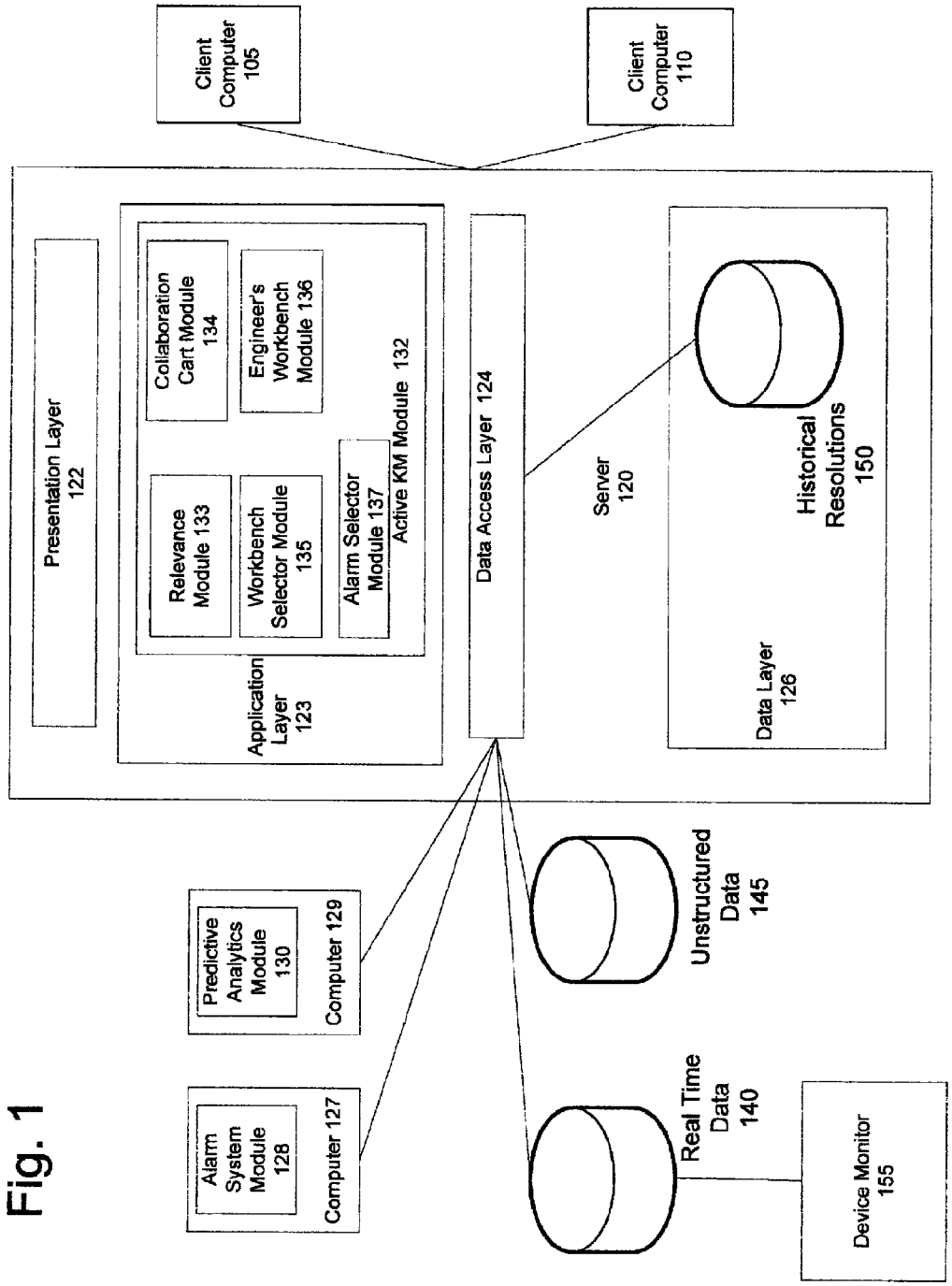
FIG. 1 illustrates an exemplary architecture for the components of an active knowledge management system in accordance with an exemplary embodiment of the present invention.

Turning to the drawings, in which like numerals indicate like elements throughout the figures, exemplary embodiments of the invention are described in detail. Referring to FIG. 1, aspects of an exemplary distributed computing environment are illustrated in which an active knowledge management software module is installed on a server computer.

Referring to FIG. 1, aspects of an exemplary computing environment are illustrated in which a system for actively managing the knowledge of an organization operates. Those skilled in the art will appreciate that FIG. 1 and the associated discussion are intended to provide a brief, general description of the preferred computer hardware and software program modules, and that additional information is readily available in the appropriate programming manuals, user guides, and similar publications.

FIG. 1 illustrates an exemplary active knowledge management module 132 installed on server 120. The active knowledge management module 132 is part of the application layer of server 120. Server 120 also comprises a presentation layer 122, a data access layer 124, and a data layer 126. The presentation layer 122 can comprise software modules used to display information for example on client computers 105 and 110. The data access layer 124 comprises software modules used to retrieve data from and store data in the real time data store 140, the unstructured data 145, and the historical resolutions data store 150. The software modules of the data access layer 124 also can provide data to and receive data from the alarm systems module 128 and the predictive analytics module 130. In the exemplary embodiment shown in FIG. 1, server 120 also comprises a data layer 126. In FIG. 1, the historical resolutions data store 150 is illustrated as part of the data layer 126. In alternate embodiments of the present invention, the data layer 126 of server 120 can also comprise either or both of the real time data store 140 and the unstructured data 145. Similarly, in yet other embodiments of the invention, the historical resolutions data store 150 can be installed on a separate computer from the server 120.

The exemplary system illustrated in FIG. 1 also comprises device monitor 155. The device monitor 155 can comprise one or more of a variety of instruments that monitor equipment and collect data from that equipment. For example, the device monitor 155 could be positioned on equipment located in an oil drilling field or other types of remote equipment. The device monitor 155 monitors the equipment and collects data concerning the operation of the equipment. The collected data is referred to as real time data and can be stored in real time data store 140.

As shown in the exemplary system illustrated in FIG. 1, an alarm system module 128 or a predictive analytics module 130 can access the real time data stored in real time data store 140 through the data access layer 124. In alternate embodiments of the invention, the alarm system module 128 and the predictive analytics module 130 may access the real time data store 140 through an alternate connection rather than via data access layer 124 of server 120. Both the alarm system module 128 and the predictive analytics module 130 are tools that are commercially available. The alarm system module 128 comprises software modules that can receive and analyze real time data to determine whether there is an alarm condition associated with the equipment from which the real time data was collected. The predictive analytics module 130 can receive and analyze real time data in order to predict when one may expect alarm conditions to arise in connection with the monitored equipment. An alarm condition can be viewed broadly as any indication of an abnormal operation condition. Although the alarm system module 128 and the predictive analytics module 130 are illustrated as separate modules running on separate computers 127 and 129 in the exemplary embodiment shown in FIG. 1, those of ordinary skill in the art will recognize that these tools can be implemented in a variety of different software modules and a variety of computer environments.

The active knowledge management module 132 installed on server 120 can comprise a variety of software modules as illustrated in FIG. 1. For example, the engineer's workbench module 136 organizes and presents the data collected by the active knowledge management module 132. One example of an approach to organizing and presenting the data by the engineer's workbench module 136 is shown in the screen displays in FIGS. 4A and 4B. The engineer's workbench module 136 can allow a user to "drag and drop" portions of data and otherwise manipulate how the data is displayed in order to assist with resolving the alarm event. The engineer's workbench module 136 also provides the interface for a user to enter new information associated with the current resolution of an alarm event so that the new information can be captured and managed for use by other people in the future. In other embodiments, the engineer's workbench module 136 can provide other functions for manipulating and displaying data and receiving input associated with the data.

The active knowledge management module 132 can also comprise a workbench selector module 135. The workbench selector module 135 allows a user to browse other data such as unstructured data or data items associated with particular historical resolutions. The workbench selector module 135 can provide a user with additional tools for displaying and analyzing data accessible through the data access layer 124.

The active knowledge management module 132 can comprise an alarm selector module 137. The alarm selector module 137 can receive a user's selection of an alarm from a list of alarms in a display. The alarm selector module 137 and the active knowledge management module 132 can use the selected alarm to retrieve and display default data associated with the alarm and provide the selected alarm to the relevance module 133 for identifying a relevant historical solution.

The relevance module 133 of the active knowledge management module 132 can identify one or more historical resolutions that are relevant to the selected alarm. The relevance module 133 assists the user by identifying historical resolutions in the historical resolution data store 150 that are most likely to be of assistance in resolving the current selected alarm. The relevance module 133 can be designed in a variety of ways to identify similarities between the current selected alarm and historical resolutions of previous alarms. For example, the relevance module 133 can compare the location, equipment type and application type of the equipment associated with the current selected alarm and that of the historical resolution. In other embodiments of the invention only certain of these factors may be compared or other factors may be compared. Furthermore, the relevance module 133 can assign weightings to certain factors that are more or less relevant to a particular type of equipment or a particular type of alarm. One example of an algorithm for determining relevance is the following:

$$R(C, H) = A * \text{Rank}(H) + B * \sum_{i=1}^{n} R_i(C_i, H_i)$$

Where, $R_i = Y_A * f_1(\text{App}_{Ci}, \text{App}_H) + Z_A * f_2(\text{Equip}_{Ci}, \text{Equip}_H) + P_A * f_3(\text{Loc}_{Ci}, \text{Loc}_H) + \ldots$ In the foregoing example, Rank(H) is the ranking function for the historical resolution. A and B are the weights for the ranking and aggregate data set relevance. $Y_A$, $Z_A$, and $P_A$ are the alarm-specific distance weighting factors. $f_1(\text{App}_{Ci}, \text{App}_H)$ is the distance function for the application type. $f_2(\text{Equip}_{Ci}, \text{Equip}_H)$ is the distance function for the equipment type. $f_3(\text{Loc}_{Ci}, \text{Loc}_H)$ is the distance function for the physical location of the equipment.

Ranking Function Rank(H).

The ranking function returns a summary measure of end user-assessed usefulness. This function is analogous to the ranking functions widely used in Internet commerce, e.g., Netflix user ratings of films, Amazon.com user rating of books, and more specifically the "did you find this article" helpful functionality in technical support websites such as Microsoft Knowledge Base. The purpose of the ranking function in the relevance module is to raise the calculated relevance R(C,H) of historical cases that are highly useful but may be tagged inappropriately for their applicability. Inappropriate tagging occurs when a resolution is associated with an alarm that is not proximate to the root cause of the problem; this occurs with some regularity because the alarm arriving first for triage is frequently the alarm with the tightest control bounds rather than the alarm closest to the problem. For example, a blockage in a platform onboarding valve may trigger a downhole pressure alarm in the related well before triggering the more proximate differential pressure alarm simply because the well's drawdown is being watched closely and therefore tight control bounds have been set on downhole pressure while the differential pressure bounds have remained unchanged. If such a blockage problem is worked through to resolution on the basis of the downhole pressure alarm, it will be incorrectly tagged as a downhole pressure solution if the same type of blockage occurs in the future. This incorrect tagging will substantially lower it's calculated relevance based on distance functions; the ranking function Rank(H) allows for compensation of this type of tagging error.

A and B Weights.

The A and B weights mitigate the bootstrap problem with the ranking function. During the early phases following deployment of the active knowledge management module at a new asset, the relatively sparse set of user rankings can cause a distorted estimate of relevance to be returned by the Rank(H) function (in a similar way that, e.g., an Amazon.com book ranking with 500 responses is more reliably reflective of end user sentiment than one with only two or three responses). The use of A and B weights allows the relative contribution of the ranking function to be given little weight when few user rankings exist and increasing weight as more rankings are applied. For example, the A weight can be initially set to be a small non-zero number and increased as a logarithmic function of the number of user-supplied rankings of (H), i.e., it increases rapidly with the first few rankings and shows diminishing increases as the number of rankings grows large, asymptotically approaching a fixed limit. B is a weighted inverse. The specific logarithmic functions and inverse weighting can be calculated based on the scope and size of the deployment; the number of rankings that can reasonably be expected for each historical resolution is obviously heavily dependent on the size and scope of each particular deployment.

$Y_A$, $Z_A$, and $P_A$ Distance Weighting Factors.

These factors allow adjustment to the relative importance of application type, equipment type, and location, respectively, when calculating the aggregate data set relevance. These are set per alarm type and are necessary simply because not all distance functions are relevant for all alarm types. As a simple example, consider a choke position alarm. Sudden choke changes can be a problem, and root cause and resolution of the problem are likely to be strongly related to both the equipment type of the choke and the location in which it is installed. Application type, however, makes little sense here—to the extent that e.g., a choke in an onshore tight gas well might have different problems than one in a deepwater oil well, this is already captured by the equipment type and location factors. In this case, $Y_A$ would be set to zero to discount the relevance of application type. On the other hand, a platform using identical compressors to handle widely varying gas hydration levels might find that problems with a wet gas compressor have more in common with wet gas compressors on other platforms than with the dry gas compressor that is 50 feet away. In this case, the application type is highly relevant and would be adjusted accordingly. As such, the $Y_A$, $Z_A$, and $P_A$ distance weights typically are established on a case by case basis as part of the alarm development process.

Distance Functions ($f_1$, $f_2$, $f_3$).

The distance functions ($f_1$, $f_2$, $f_3$) assume the existence or creation of partially ordered sets describing a hierarchical relationship between the relevant set members. In practical application, both the members and ordering of these sets will be specific to the industrial particulars of the knowledge to be captured. Generally this information will be present within the data models of existing applications in use for the knowledge capture asset. For example, within the domain of deepwater oil and gas production, the function $f_2$ which defines the distance between two types of equipment would be based on an equipment model hierarchy such as would normally be found in an existing supply chain or preventive maintenance application (e.g., SAP). In such a hierarchy two, e.g., compressors of identical capacity, model, and application would reside in the same part of the hierarchy and have a distance of zero. Compressors with similar capacity and application with a different model type or with similar model type and application but differing capacities would have a small but non-zero distance, and compressors differing in all respects would have a larger distance. This would be equally true for the other functions, for example, the $f_3$ distance function for physical location would use existing production train modeling applications and/or process and instrumentation diagram (P&ID) models as the foundational set for the distance calculation.

Clearly, in a different domain—such as crude refining—the hierarchies would be completely different; both the equipment types and physical locations would be radically different than is the norm in the deepwater production domain. In the particular case of this example, the industrial particulars of the refining domain involve processes and process trains with a much higher degree of complexity than that of deepwater, leading to more complex equipment hierarchies and correspondingly larger distances between related equipment items. Without some type of weighting factor, the higher raw distance values produced by this domain change would tend to weight the equipment distance relatively higher than other distance functions and consequently weight the overall aggregate data set relevance higher than the ranking factor. The weighting factors $Y_A$, $Z_A$, and $P_A$ address these differences in the range of values returned by the raw distance functions. It should be noted that these factors are alarm-specific; the weights which apply for one alarm type may not apply for all others (even within a similar domain) as for each alarm type the relevance of each distance type will vary.

The foregoing exemplary algorithm is designed to be used as a framework within the relevance module 133. In other words, the weighting factors and distance functions can be modified or tuned for each particular implementation. With each implementation of the relevance module 133, the weighting factors and distance functions can vary in importance and be adjusted accordingly.

Those of skill in the art will recognize that the foregoing algorithm is merely one example for implementing the relevance module 133 and that other methods and techniques can be used in implementing relevance modules for other embodiments of the invention.

The active knowledge management module 132 can further comprise a collaboration cart module 134. The collaboration cart module 134 can allow sharing of data associated with an alarm resolution with another user. For example, in the embodiment illustrated in FIG. 1, a user operating client computer 105 can use the collaboration cart module 134 to share a proposed alarm resolution with client computer 110.

The foregoing components of the active knowledge management module 132 are merely examples. Other embodiments of the active knowledge management module 132 may include different features and may comprise different software modules organized in different designs. Furthermore, although the active knowledge management module 132 is shown installed on server 120, in alternate embodiments it may be installed in other computing environments.

Figure 2:
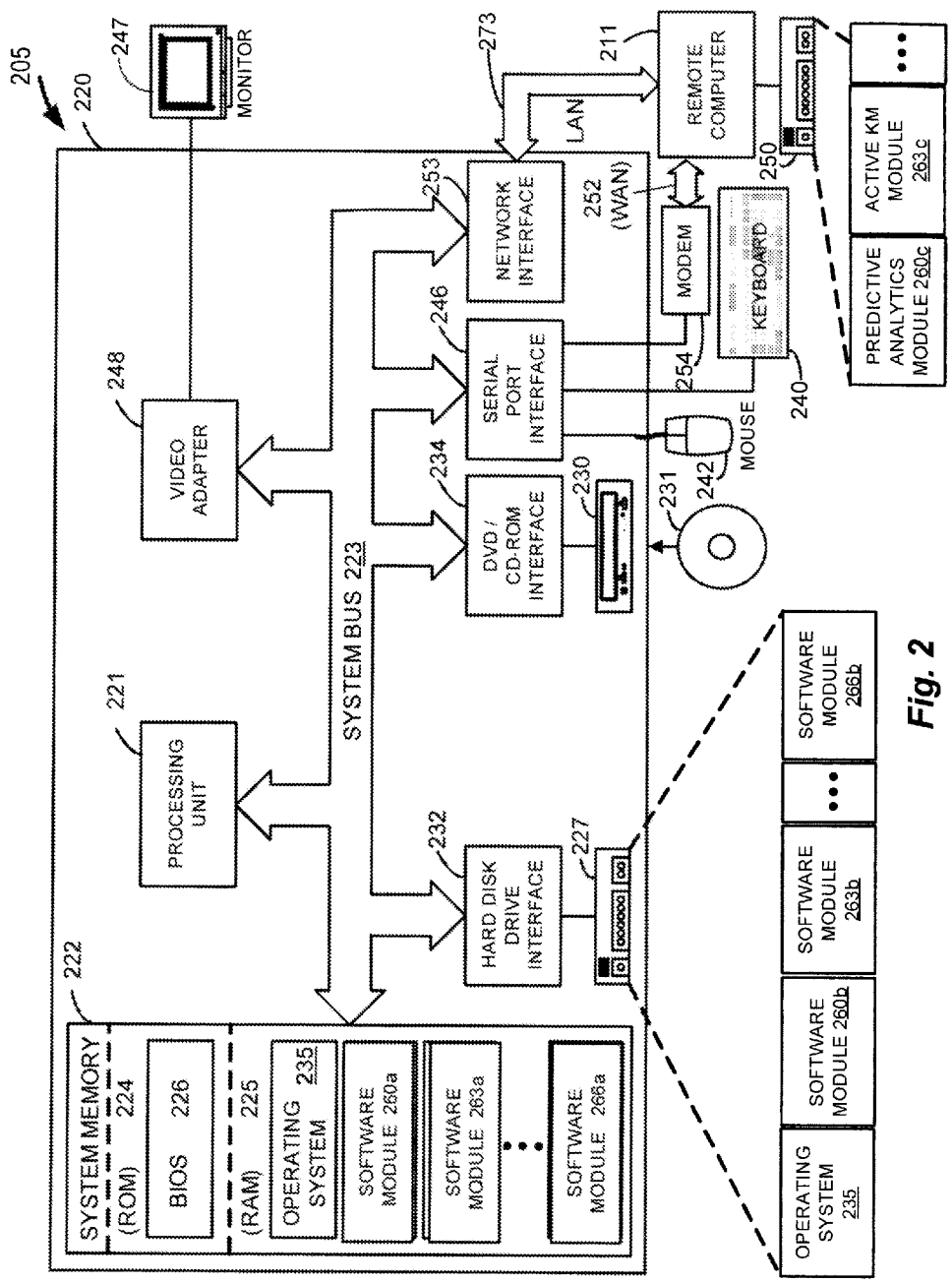
FIG. 2 illustrates components of a computer in accordance with an exemplary embodiment of the present invention.

FIG. 2 illustrates a conventional computing device 220 suitable for supporting the operation of the preferred embodiment of the present invention. In FIG. 2, the computing device 220 operates in a networked environment with logical connections to one or more remote computers 211. For example, conventional computing device 220 can correspond to client computer 105 in FIG. 1 and remote computer 211 can correspond to server 120 in FIG. 1. The logical connections between computing device 220 and remote computer 211 are represented by a local area network 273 and a wide area network 252. Those of ordinary skill in the art will recognize that in this client/server configuration, the remote computer 211 may function as a file server or computer server. Those of ordinary skill in the art also will recognize that the invention can function in a stand-alone computing environment.

The computing device 220 includes a processing unit 221, such as "PENTIUM" microprocessors manufactured by Intel Corporation of Santa Clara, Calif. The computing device 220 also includes system memory 222, including read only memory (ROM) 224 and random access memory (RAM) 225, which is connected to the processor 221 by a system bus 223. The preferred computing device 220 utilizes a BIOS 226, which is stored in ROM 224. Those skilled in the art will recognize that the BIOS 226 is a set of basic routines that helps to transfer information between elements within the computing device 220. Those skilled in the art will also appreciate that the present invention may be implemented on computers having other architectures, such as computers that do not use a BIOS, and those that utilize other microprocessors.

Within the computing device 220, a local hard disk drive 227 is connected to the system bus 223 via a hard disk drive interface 232. A CD-ROM or DVD drive 230, which is used to read a CD-ROM or DVD disk 231, is connected to the system bus 223 via a CD-ROM or DVD interface 234. In other embodiments, other types of storage devices such as external hard disk drives and USB thumb drives can be used. A user enters commands and information into the computing device 220 by using input devices, such as a keyboard 240 and/or pointing device, such as a mouse 242, which are connected to the system bus 223 via a serial port interface 246. Other types of pointing devices (not shown in FIG. 2) include track pads, track balls, pens, head trackers, data gloves and other devices suitable for positioning a cursor on a computer monitor 247. The monitor 247 or other kind of display device is connected to the system bus 223 via a video adapter 248.

The remote computer 211 in this networked environment is connected to a remote memory storage device 250. This remote memory storage device 250 is typically a large capacity device such as a hard disk drive, CD-ROM or DVD drive, magneto-optical drive or the like. Those skilled in the art will understand that software modules are provided to the remote computer 211 via computer-readable media. The computing device 220 is connected to the remote computer by a network interface 153, which is used to communicate over the local area network 173.

In an alternative embodiment, the computing device 220 is also connected to the remote computer 211 by a modem 254, which is used to communicate over the wide area network 252, such as the Internet. The modem 254 is connected to the system bus 223 via the serial port interface 246. The modem 254 also can be connected to the public switched telephone network (PSTN) or community antenna television (CATV) network. Although illustrated in FIG. 2 as external to the computing device 220, those of ordinary skill in the art can recognize that the modem 254 may also be internal to the computing device 220, thus communicating directly via the system bus 223. Connection to the remote computer 211 via both the local area network 273 and the wide area network 252 is not required, but merely illustrates alternative methods of providing a communication path between the computing device 220 and the remote computer 211.

Although other internal components of the computing device 220 are not shown, those of ordinary skill in the art will appreciate that such components and the interconnection between them are well known. Accordingly, additional details concerning the internal construction of the computing device 220 need not be disclosed in connection with the present invention.

Those skilled in the art will understand that program modules, such as an operating system 235 and other software modules 260a, 263a and 266a, and data are provided to the computing device 220 via computer-readable media. In the preferred computing device, the computer-readable media include local or remote memory storage devices, which may include the local hard disk drive 227, CD-ROM or DVD 231, RAM 225, ROM 224, and the remote memory storage device 250.

Figure 3A:
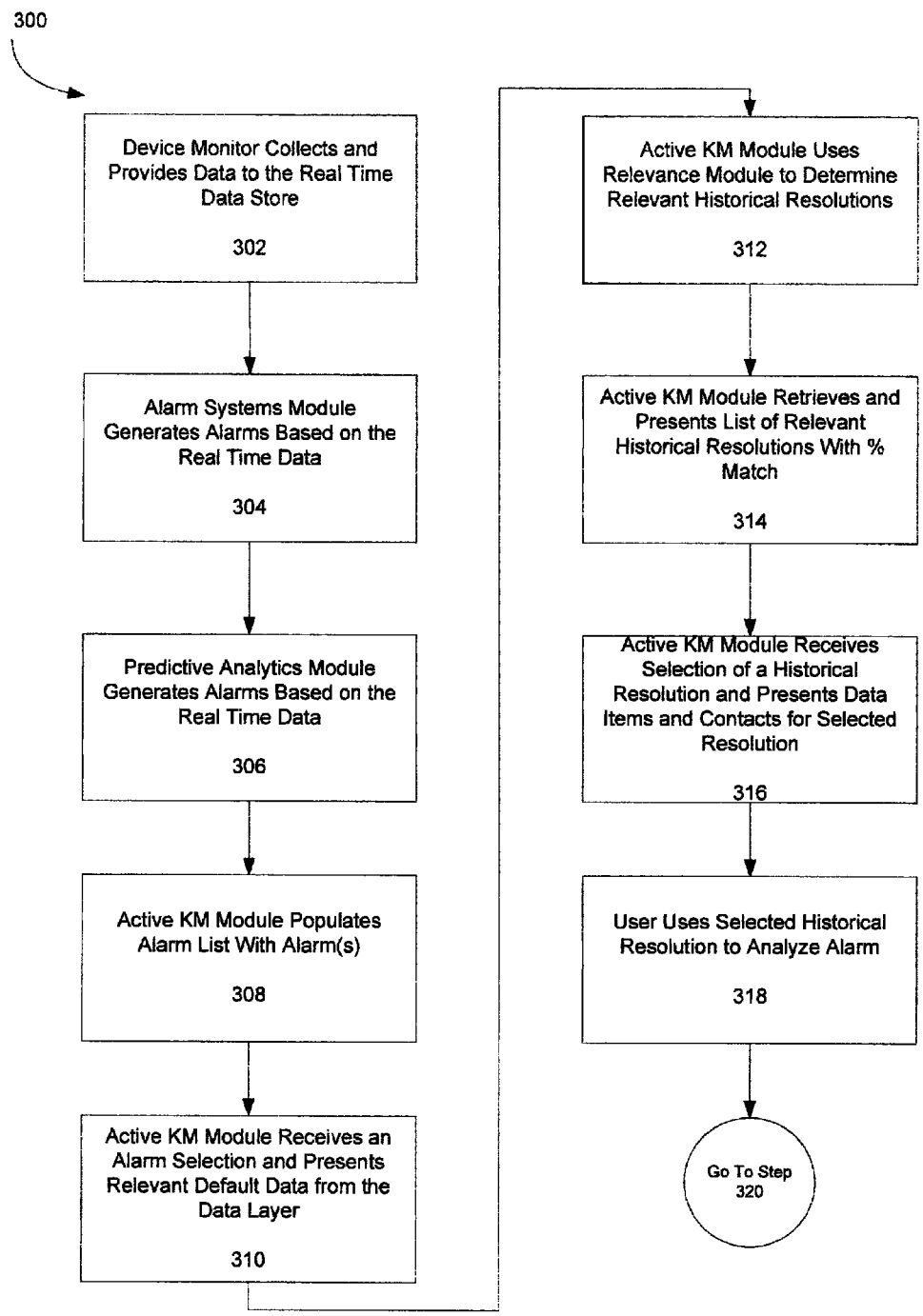
FIGS. 3A and 3B illustrate a method for actively managing knowledge in accordance with an exemplary embodiment of the present invention.
Figure 3B:
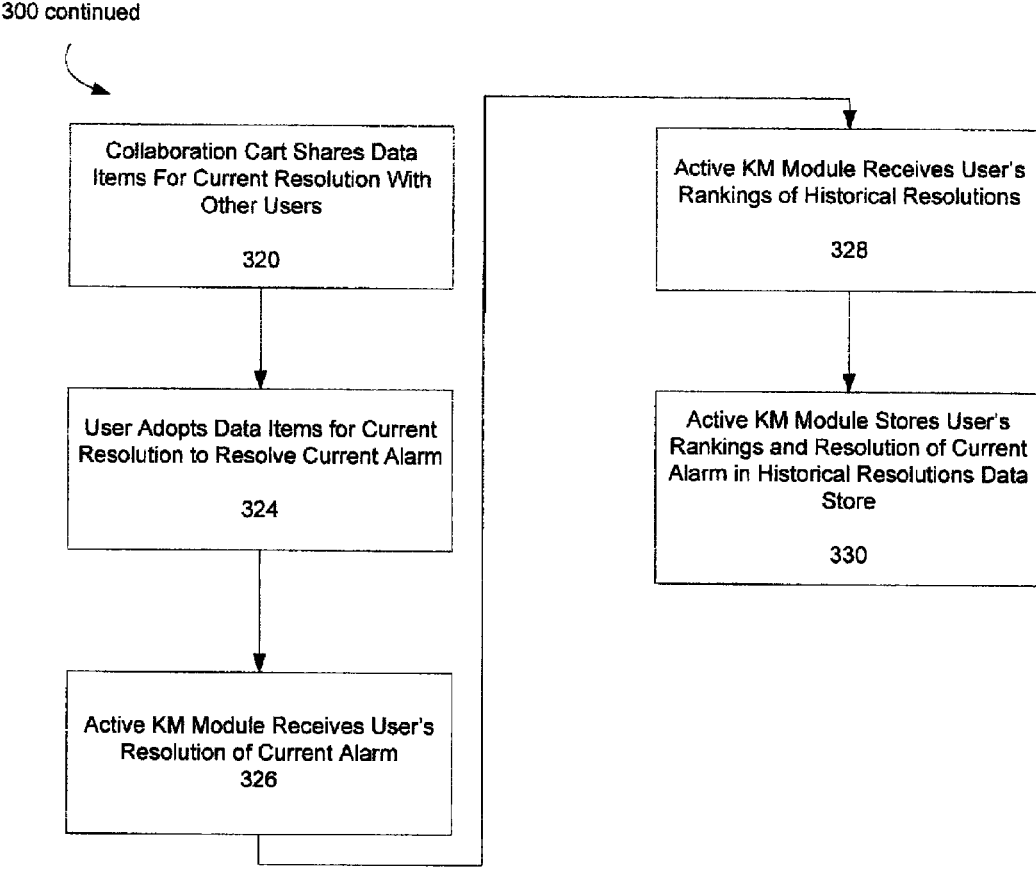

Referring to FIGS. 3A and 3B, an exemplary method 300 for actively managing the knowledge of an organization is illustrated. Those of skill in the art will recognize that exemplary method 300 and the following discussion are merely one embodiment of the invention. In alternate embodiments of the invention, certain steps of method 300 may be performed in a different sequence, performed in parallel, or eliminated altogether. Furthermore, in alternate embodiments of the invention other software modules operating on local or remote computing devices may perform the steps of exemplary method 300.

Turning now to step 302, device monitor 155 collects data from a piece of equipment and provides the data to the real time data store 140. The real time data store 140 can store data for access by various components of the exemplary system shown in FIG. 1. For example, in steps 304 and 306, the alarm system module 129 and the predictive analytics module 130 can receive data from the real time data store 140 and analyze the data to generate one or more alarm events. For example, the alarm system module 129 may have predefined thresholds relating to the operation of various pieces of equipment. When the data collected by the device monitor 155 falls outside one of these predefined thresholds, the alarm system module 129 can generate an alarm event. Similarly, the predictive analytics module 130 can be designed to analyze data collected by the device monitor 155 and predict when a piece of equipment may be approaching a condition that will generate an alarm. Although exemplary process 300 illustrates processes using both the alarm system module 129 and the predictive analytics module 130 in steps 304 and 306, alternate embodiments of the invention may only use one of these modules.

In step 308 of exemplary process 300, the active knowledge management module 132 receives alarm events from the alarm system module 129 and the predictive analytics module 130 and populates an alarm list with the received alarm events. The engineer's workbench module 136 can display the alarm list for a user and the user can select an alarm on which to work. In step 310, the active knowledge management module 132 receives the user's selection from the list of alarms and presents default data relevant to the selected alarm. The default data may be retrieved by the active knowledge management module 132 from any of the data storage modules in the data layer. For example, default data can be retrieved from the real time data store 140, the unstructured data 145, or data items associated with resolutions stored in the historical resolutions data store 150. Examples of default data include specifications for the equipment associated with the alarm event and related data collected by the device monitor 155.

Figure 4A:
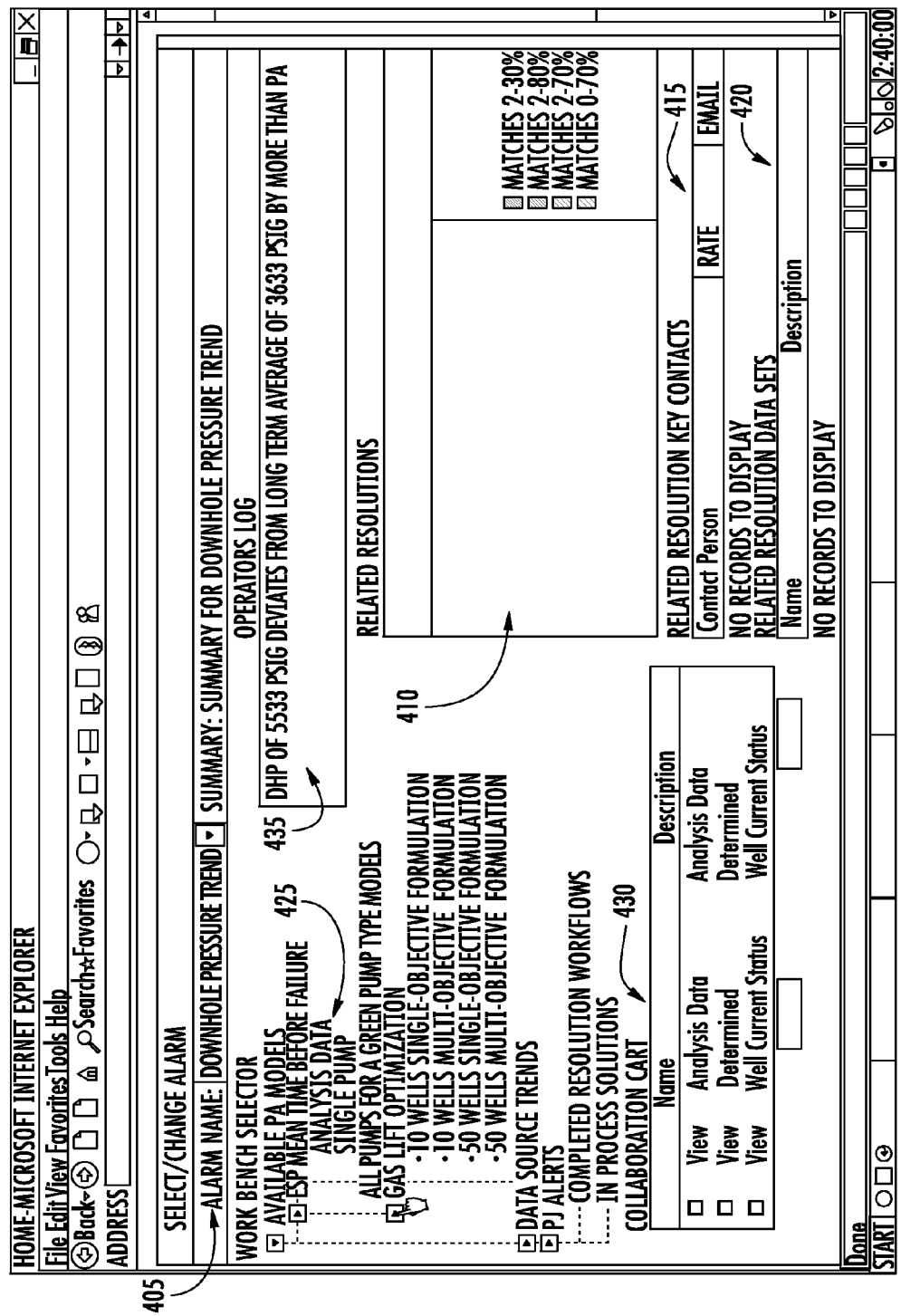
FIGS. 4A and 4B illustrates exemplary screen displays showing certain features of an active knowledge management system in accordance with an exemplary embodiment of the present invention.

In step 312, the relevance module 133 analyzes resolutions stored in the historical resolutions data store 150 to identify prior resolutions that are relevant to the current alarm selected by the user. As illustrated in FIG. 4A, the relevance module can calculate relevance as a percentage and display the percentages with the identified historical resolutions using the engineer's workbench module 136. The relevance module 133 can use a variety of criteria to determine which prior resolutions are most relevant to the current alarm. As described above, relevance can be determined, among other factors, based on the type of equipment and the location of the equipment associated with the alarm. Using the relevance module's calculations, in step 314, the active knowledge management module 132 can retrieve and present a list of relevant historical resolutions. As shown in FIG. 4A, the match percentage indicating the degree of relevance for a historical resolution can also be displayed.

A user working with the engineer's workbench module 136 can review the default data presented in step 310 and the list of relevant historical resolutions presented in step 314 in connection with working on a resolution for the current selected alarm. For example, in step 316, the active knowledge management module 132 can receive a selection from a user of a historical resolution and present data items and contacts associated with the selected historical resolution. While the user would typically select a resolution from the list of related resolutions, as shown in the example in FIG. 4A, the user is not limited to selecting from those resolutions that the relevance module 133 determines are relevant. Through the workbench selector module 135, the active knowledge management module 132 has access to other resolutions stored in the historical resolutions data store 150. Referring to step 318 of exemplary process 300, the user can review the data items and contacts associated with the selected historical resolution in working on resolving the current selected alarm. For example, data items can provide information about how the historical resolution addressed a previous alarm that was similar to the current selected alarm. Similarly, contact information my provide the names and contact information that worked on the selected historical resolution. The current user may be able to contact the persons identified in the contact information to receive their assistance in resolving the current selected alarm. The user may adopt portions of or the entirety of the historical resolution in working on a resolution to the current selected alarm.

Referring to step 320 of exemplary process 300, the user can use the collaboration cart module 134 for sharing data items associated with the current solution with other users. The collaboration cart module 134 provides a tool for the user to easily share and discuss the resolution for the current selected alarm with other people. Once the user has decided on a resolution for the current selected alarm, in step 324, the user adopts the data items associated with the resolution for the current selected alarm. In step 326, the active knowledge management module 132 can receive annotations from the user explaining the resolution of the current alarm. In step 328, the active knowledge management module 132 prompts the user to rank the historical resolutions to reflect which were most helpful in reaching the current resolution. In step 330, the active knowledge management module 132 stores the rankings and the resolution of the current selected alarm in the historical resolutions data store 150. The stored resolution can include the annotations received from the user, contact information for people associated with the resolution, and data items associated with the resolution.

Steps 326 through 330 involve capturing the knowledge of the current user in reaching the resolution. By making the knowledge capture part of the process of resolving an alarm, the exemplary method 300 mitigates the loss of knowledge that occurs when individuals leave an organization. Alternate embodiments of the invention may perform variations of steps 326 through 330. However, by incorporating knowledge capture into the process of resolving an alarm, the present invention improves conventional knowledge management approaches. Furthermore, those skilled in the art will appreciate that method 300 illustrated in FIGS. 3A and 3B is merely exemplary. For instance, in alternate embodiments of the invention, the software modules illustrated in FIG. 1 that perform the steps of method 300 can be consolidated into a single software module or can be split up into multiple sub-component software modules.

Figure 4B:
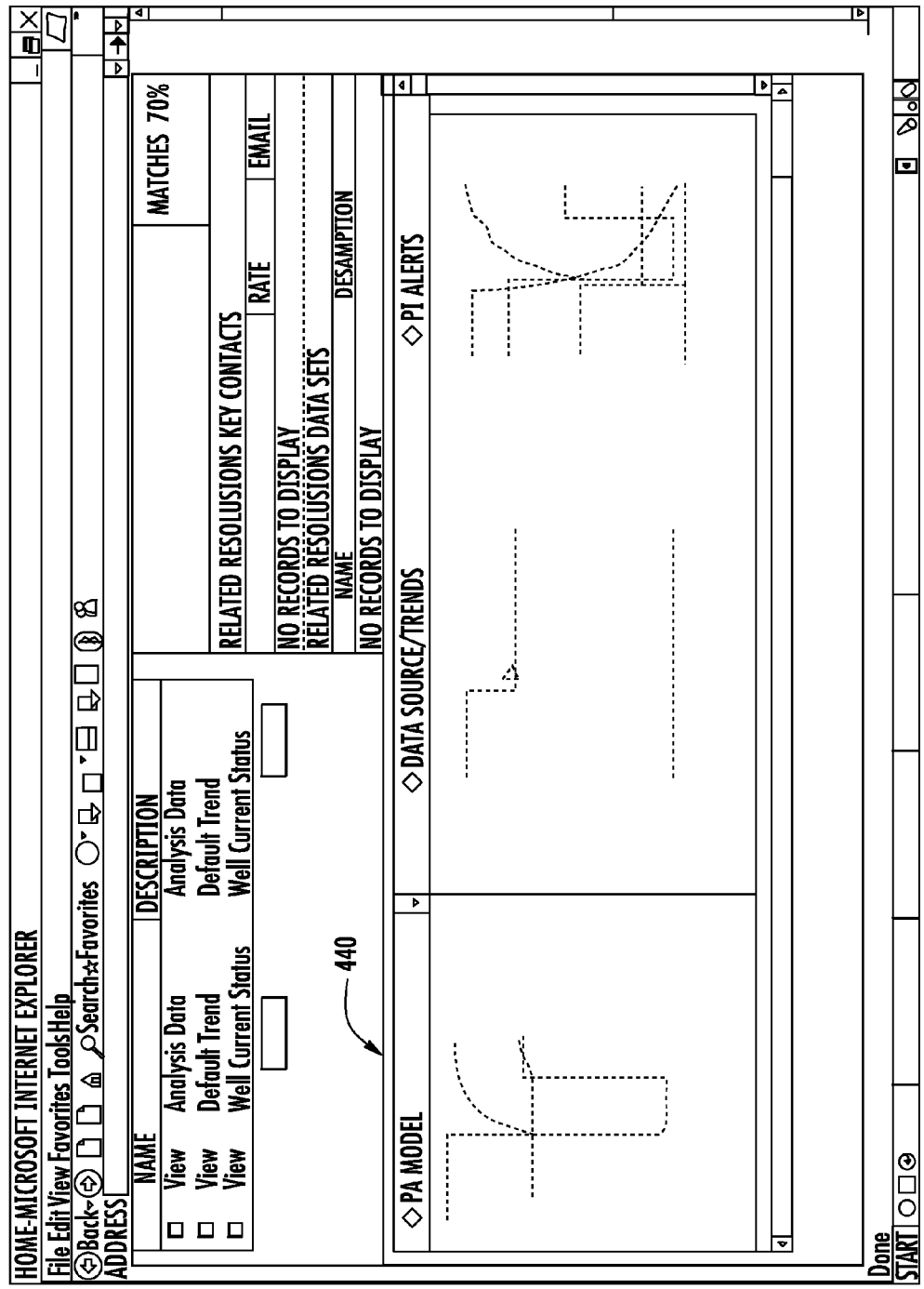

Turning to FIGS. 4A and 4B, exemplary screen displays associated with the active knowledge management module 132 are illustrated. FIGS. 4A and 4B are portions of the same screen display with FIG. 4A showing the top portion and FIG. 4B showing the bottom portion of the screen display. In FIG. 4A, element 405 shows the current selected alarm is a downhole pressure trend. Element 410 of FIG. 4A shows the related resolutions generated by the relevance module 133. In this example, the related resolutions include a summary of the resolution and a percentage value indicating the degree of relevance to the current selected alarm. Elements 415 and 420 are contacts and data sets related to selected historical resolutions. In the example shown in FIG. 4A, an historical resolution has not yet been selected, so elements 415 and 420 are not populated with data. Once an historical resolution is selected, element 415 can contain the names and contact information of people familiar with the selected historical resolution. Similarly, element 420 can contain data items associated with the selected historical resolution.

Referring to FIG. 4B, element 440 shows examples of default data that the active knowledge management module displays upon receiving the alarm selection. While element 440 is shown in the form of graphical displays of data, the default data can take a variety of forms. Turning back to FIG. 4A, element 425 illustrates the interface presented by the workbench selector module 135. The workbench selector interface 425 provides the user with access to other data available in the data layer. As the user is working on a resolution to the current selected alarm, the collaboration cart 430 allows the user to share information about the proposed resolution with other users. Finally, the user can use the operator's log 435 to input notes about the resolution for the current selected alarm. Those of skill in the art will appreciate that the foregoing elements of FIGS. 4A and 4B are examples. Other embodiments of the invention may comprise screen displays in different formats and comprising different elements than those illustrated in exemplary FIGS. 4A and 4B.

Figure 5:
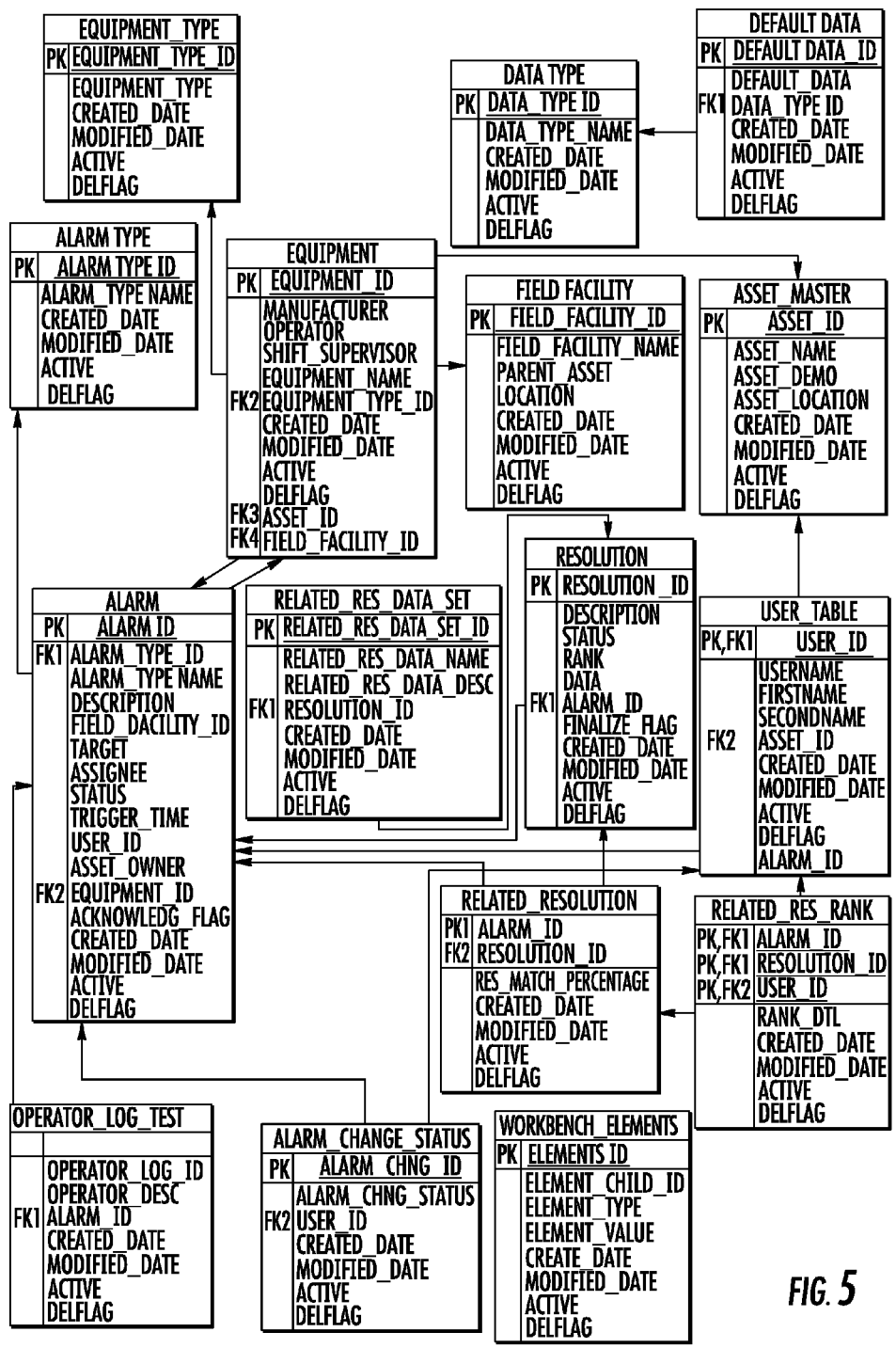
FIG. 5 illustrates an data model in accordance with an exemplary embodiment of the present invention.

Referring to FIG. 5, an exemplary data model is illustrated identifying and organizing the data associated with the foregoing exemplary embodiments. The exemplary data model in FIG. 5 shows the interrelationships among the data associated with the active knowledge management module. For example, the equipment data is associated with the alarm data, the equipment type data, the field facility data, and the asset master data. Those of skill in the art will recognize that the data model shown in FIG. 5 is merely one example and that in alternate embodiments of the invention, the data can be organized in other ways.

In conclusion, the invention, as represented in the foregoing exemplary embodiments, provides systems and methods for actively managing the knowledge of an organization. As described in the foregoing exemplary embodiments, an active knowledge management module can receive current alarm events and provide a user with access to historical data that can assist in resolving the alarm event. The active knowledge management module also can analyze the historical data and identify for the user historical data that is relevant to the current alarm. The user can adopt various elements of historical resolutions is identifying a resolution to the current alarm. The active knowledge management module captures the resolution for the current alarm and any data associated with the resolution of the current alarm so that the information is available for future users. The active knowledge management module also solicits feedback from the user as to which, if any, of the historical resolutions were helpful in resolving the current alarm.

The embodiments set forth herein are intended to be exemplary. From the description of the exemplary embodiments, equivalents of the elements shown herein and ways of constructing other embodiments of the invention will be apparent to practitioners of the art. For example, the exemplary methods for capturing the resolution of the current selected alarm and the user's knowledge associated with that resolution may be modified but remain within the scope of the invention. Similarly, while representative software modules are described as performing the methods of the invention, variations of these software modules can also be used to execute the invention. Moreover, while the exemplary embodiments herein are described as applied to capturing knowledge associated with managing engineering problems, the invention can also be applied to capturing the knowledge associated with other tasks in fields such as information technology services or financial services. Many other modifications, features and embodiments of the invention will become evident to those of skill in the art. It should be appreciated, therefore, that many aspects of the invention were described above by way of example only and are not intended as required or essential elements of the invention unless explicitly stated otherwise. Accordingly, it should be understood that the foregoing relates only to certain embodiments of the invention and that numerous changes can be made therein without departing from the spirit and scope of the invention.

We claim:

1. An active knowledge management computing apparatus comprising a memory coupled to a processor which is configured to execute programmed instructions stored in the memory comprising:
identifying an alarm event based on received device data concerning operation of a monitored device;
determining a relevance of one or more historical resolutions for the identified alarm event for the monitored device based on a ranking function, an aggregate data set relevance, and one or more weights applied to each of the ranking function and the aggregate data set relevance, wherein the aggregate data set relevance is based on one or more distance functions and a distance weighting factor applied to each of the one or more distance functions;
identifying and providing at least a subset of the one or more historical resolutions for the identified alarm event to a client computing device based on the determined relevance; and
receiving and storing a current resolution of the identified alarm event and a ranking of one or more of the provided historical resolutions from the client computing device.

2. The apparatus of claim 1, wherein the received device data is real time data.

3. The apparatus of claim 1, wherein the identifying the alarm event further comprises predicting the alarm event from the received device data.

4. The apparatus of claim 1, wherein the ranking function returns a measure of end user-assessed usefulness for at least one of the one or more historical resolutions for the identified alarm event for the monitored device based at least in part on one or more previously received and stored rankings of the at least one of the one or more historical resolutions.

5. The apparatus as set forth in claim 1 wherein each of the distance functions utilizes a stored hierarchical relationship between the monitored device and other devices.

6. The apparatus of claim 1, wherein the one or more distance functions correspond to a location, a device type, or an application type of the monitored device associated with the identified alarm event.

7. The apparatus of claim 1, further comprising identifying and providing additional data associated with the monitored device and the identified alarm for the device to the client computing device.

8. The apparatus of claim 7, wherein the additional data further comprises unstructured data.

9. The apparatus of claim 1 wherein the receiving and storing the current resolution of the identified alarm event further comprises receiving and storing additional data associated with the current resolution of the identified alarm for the monitored device from the client computing device.

10. A non-transitory computer readable medium having stored thereon instructions for actively managing knowledge comprising machine executable code which when executed by at least one processor, causes the processor to perform steps comprising:
identifying an alarm event based on received device data concerning operation of a monitored device;
determining a relevance of one or more historical resolutions for the identified alarm event for the monitored device based on a ranking function, an aggregate data set relevance, and one or more weights applied to each of the ranking function and the aggregate data set relevance, wherein the aggregate data set relevance is based on one or more distance functions and a distance weighting factor applied to each of the one or more distance functions;
identifying and providing at least a subset of the one or more historical resolutions for the identified alarm event to a client computing device based on the determined relevance; and
receiving and storing a current resolution of the identified alarm event and a ranking of one or more of the provided historical resolutions from the client computing device.

11. The medium of claim 10, wherein the received device data is real time data.

12. The medium of claim 10, wherein the identifying the alarm event further comprises predicting the alarm event from the received device data.

13. The medium of claim 10, wherein the ranking function returns a measure of end user-assessed usefulness for at least one of the one or more historical resolutions for the identified alarm event for the monitored device based at least in part on one or more previously received and stored rankings of the at least one of the one or more historical resolutions.

14. The medium as set forth in claim 10 wherein each of the distance functions utilizes a stored hierarchical relationship between the monitored device and other devices.

15. The medium of claim 10, wherein the one or more distance functions correspond to a location, a device type, or an application type of the monitored device associated with the identified alarm event.

16. The medium of claim 10, further comprising identifying and providing additional data associated with the monitored device and the identified alarm for the device to the client computing device.

17. The medium of claim 16, wherein the additional data further comprises unstructured data.

18. The medium of claim 10 wherein the receiving and storing the current resolution of the identified alarm event further comprises receiving and storing additional data associated with the current resolution of the identified alarm for the monitored device from the client computing device.

19. A method for actively managing knowledge, the method comprising:
identifying by an active knowledge management computing device an alarm event based on received device data concerning operation of a monitored device;
determining by the active knowledge management computing device a relevance of one or more historical resolutions for the identified alarm event for the monitored device based on a ranking function, an aggregate data set relevance, and one or more weights applied to each of the ranking function and the aggregate data set relevance, wherein the aggregate data set relevance is based on one or more distance functions and a distance weighting factor applied to each of the one or more distance functions;
identifying and providing by the active knowledge management computing device at least a subset of the one or more historical resolutions for the identified alarm event to a client computing device based on the determined relevance; and
receiving and storing by the active knowledge management computing device a current resolution of the identified alarm event and a ranking of one or more of the provided historical resolutions from the client computing device.

20. The method of claim 19, wherein the received device data is real time data.

21. The method of claim 19, wherein the identifying the alarm event further comprises predicting the alarm event from the received device data.

22. The method of claim 19, wherein the ranking function returns a measure of end user-assessed usefulness for at least one of the one or more historical resolutions for the identified alarm event for the monitored device based at least in part on one or more previously received and stored rankings of the at least one of the one or more historical resolutions.

23. The method as set forth in claim 19 wherein each of the distance functions utilizes a stored hierarchical relationship between the monitored device and other devices.

24. The method of claim 19, wherein the one or more distance functions correspond to a location, a device type, or an application type of the monitored device associated with the identified alarm event.

25. The method of claim 19, further comprising identifying and providing by the active knowledge management computing device additional data associated with the monitored device and the identified alarm for the device to the client computing device.

26. The method of claim 25, wherein the additional data further comprises unstructured data.

27. The method of claim 19 wherein the receiving and storing the current resolution of the identified alarm event further comprises receiving and storing by the active knowledge management computing device additional data associated with the current resolution of the identified alarm for the monitored device from the client computing device.

* * * * *